(12) United States Patent
Ellis et al.

(10) Patent No.: US 10,953,582 B2
(45) Date of Patent: Mar. 23, 2021

(54) MESH INJECTION MOLD

(71) Applicant: Acro Tool & Die Company, Akron, OH (US)

(72) Inventors: Terry L. Ellis, Wadsworth, OH (US); Todd J. Ellwood, Uhrichsville, OH (US)

(73) Assignee: Acro Tool and Die Company, Akron, OH (US)

( * ) Notice: Subject to any disclaimer, the term of this patent is extended or adjusted under 35 U.S.C. 154(b) by 0 days.

(21) Appl. No.: 16/835,740

(22) Filed: Mar. 31, 2020

(65) Prior Publication Data
US 2020/0316835 A1 Oct. 8, 2020

Related U.S. Application Data

(60) Provisional application No. 62/827,937, filed on Apr. 2, 2019.

(51) Int. Cl.
| | | |
|---|---|---|
| *B29C 45/73* | (2006.01) | |
| *B29C 45/27* | (2006.01) | |
| *B29C 45/26* | (2006.01) | |
| B29C 33/38 | (2006.01) | |
| B29C 35/16 | (2006.01) | |
| B29C 33/04 | (2006.01) | |

(52) U.S. Cl.
CPC ........ *B29C 45/2737* (2013.01); *B29C 45/263* (2013.01); *B29C 33/04* (2013.01); *B29C 33/38* (2013.01); *B29C 35/16* (2013.01); *B29C 45/26* (2013.01); *B29C 45/73* (2013.01); *B29C 2035/1616* (2013.01)

(58) Field of Classification Search
CPC ..... B29C 45/26; B29C 45/73; B29C 45/7312; B29C 33/02; B29C 33/04; B29C 33/38; B29C 35/16; B29C 2035/1616
See application file for complete search history.

(56) References Cited

U.S. PATENT DOCUMENTS

| | | | |
|---|---|---|---|
| 3,880,563 A | * | 4/1975 | DeVos ............... B29C 51/36 425/175 |
| 4,151,236 A | | 4/1979 | Ryder |
| 4,177,238 A | | 12/1979 | Allen |
| 5,460,761 A | | 10/1995 | Larsson |
| 5,562,846 A | | 10/1996 | McKeen |
| 5,775,402 A | | 7/1998 | Sachs et al. |
| 2004/0222566 A1 | | 11/2004 | Park |
| 2006/0249872 A1 | | 11/2006 | Manuel et al. |
| 2008/0003323 A1 | | 1/2008 | Manuel et al. |

(Continued)

FOREIGN PATENT DOCUMENTS

| | | |
|---|---|---|
| CN | 206254443 U | 6/2017 |
| JP | 2016141123 A | 8/2016 |

*Primary Examiner* — James P Mackey
(74) *Attorney, Agent, or Firm* — Renner Kenner Law Firm

(57) ABSTRACT

An injection mold includes two mold halves, each of the mold halves including a mold cavity coupled with a plastic material inlet to make a plastic part within the mold cavity, a solid metal material housing the mold cavity, a conformal cooling channel positioned around the solid metal material, a plurality of mesh-containing cavities containing metallic mesh material and positioned around the solid metal material, wherein the metallic mesh material of any of the plurality of mesh-containing cavities is of a constant size.

11 Claims, 3 Drawing Sheets

(56) References Cited

U.S. PATENT DOCUMENTS

2014/0127345 A1* 5/2014 Saeger .................... B29C 33/02
            425/404
2019/0111590 A1  4/2019 Trivedi et al.
2019/0224890 A1* 7/2019 Iwano .................... B29C 43/36

* cited by examiner

MESH INJECTION MOLD

CROSS-REFERENCE TO RELATED APPLICATION

This application claims the benefit of U.S. Provisional Patent Application No. 62/827,937 filed on Apr. 2, 2019, the contents of which are incorporated herein by reference.

FIELD OF THE INVENTION

The present invention relates to an injection mold. More specifically, this invention relates to an injection mold having unique cooling attributes.

BACKGROUND OF THE INVENTION

A key issue in the injection molding of a plastic part in a mold is cycle time. The goal is the ability to mold the largest number of parts in the shortest time. Cycle time is partially controlled by the quickness in which the mold and the part can be cooled. In certain conventional injection molds, two mold halves come together to form a central cavity shaped for the part to be molded. A hot plastic stream is injected into the cavity and allowed to cool. Most basically, the cooling was controlled by channels, usually located at the periphery of the mold, which are provided with a cooling liquid or the like to cool the mold and the part being cured. Once cured, the mold halves are separated, the part can be removed, and the cycle can be repeated.

Because the cooling channels were inefficiently located at the periphery of the mold and thus were distanced from the part, the cooling process could be time consuming and thus detrimental to the cycle time of the mold. As a result, some injection molds have been provided conformal cooling channels. That is, the channels for the coolant are located near and around the mold cavity. Such conformal cooling channels cool the part more quickly, thereby efficiently decreasing the cycle time of the mold. Although such conformal cooling channels are difficult to provide when constructing the mold, with the advent of 3-D printing technologies, molds with conformal cooling can be more economically produced.

U.S. Publication No. 2019/0111590 discloses medium-encoded computer program products for designing and manufacturing conformal cooling molds with lattice structures. The conformal cooling mold includes a cavity and a core that mates with the cavity. The design and manufacturing steps include replacing solid regions of the mold cavity and the mold core with the lattice. The design and manufacturing steps further include adjusting a number of lattice unit cells for the lattice structure and adjusting thicknesses of the beams forming the lattice structure.

These various steps of the '590 Publication, particularly the adjustment steps, add increased complexity to the overall process of making the injection mold and to the injection mold itself. There remains a need in the art for an improved injection mold which provides even greater manufacturing efficiency.

SUMMARY OF THE INVENTION

An embodiment of the present invention provides an injection mold including two mold halves, each of the mold halves including a mold cavity coupled with a plastic material inlet to make a plastic part within the mold cavity, a solid metal material housing the mold cavity, a conformal cooling channel positioned around the solid metal material, a plurality of mesh-containing cavities containing metallic mesh material and positioned around the solid metal material, wherein the metallic mesh material of any of the plurality of mesh-containing cavities is of a constant size.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

Figure 1:
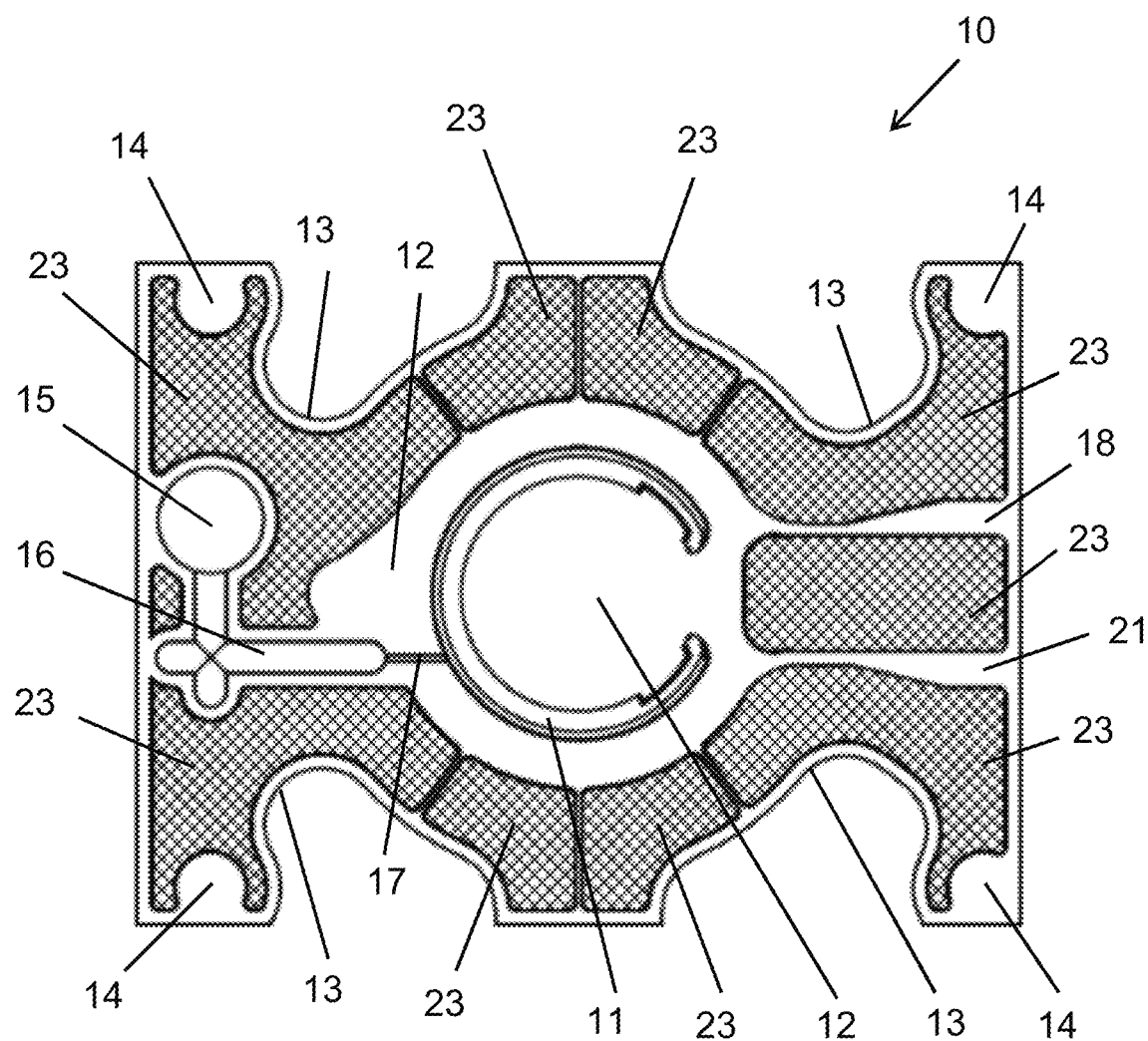
FIG. 1 is a schematic plan view of a mold half having metallic mesh material according to one or more embodiments of the present invention.

One or more embodiments of the present invention provide an improved injection mold. More specifically, embodiments of this invention relate to an injection mold which may be particularly useful for decreasing the cooling cycle time of a plastic part made within the injection mold. The injection mold includes a plurality of cavities that are filled with a metallic mesh material. Advantageously, the metallic mesh material is of a constant size across any given cavity. The metallic mesh material may also be of a constant size across all of the plurality of cavities.

With reference to the Figures, an injection mold according to one or more embodiments of the present invention is shown. One half of the injection mold is indicated generally by the numeral 10 and is used with a second identical mold half 10 to form a plastic part in a mold cavity 11. Mold cavity 11 is formed by a solid metal material 12, which may be referred to as solid metal cavity-forming material 12. Each mold half 10 can be of a generally rectangular outer configuration, which may also be referred to as a rectangular outer perimeter. The mold halves 10 can be made using additive manufacturing.

Each mold half 10 may include a plurality of cutouts 13 designed to reduce the amount of metal in the mold half 10, which solid metal otherwise disadvantageously absorbs heat and slows cooling. The corners of each mold half 10 may be provided with fastener-receiving apertures 14 so that one of the mold halves 10 may be attached to a stationary base or platen of a molding machine and the other mold half 10 may be attached to a moveable ram of the molding machine.

When the two mold halves 10 are closed upon one another, plastic material is introduced through inlet 15, through channel 16, through nozzle 17, and into mold cavity 11. The mold is then heated and the plastic part is formed. Then a conformal cooling step can be performed by introducing a coolant, such as water, into the mold halves 10 through an inlet 18, and into a channel 19, best shown in FIG. 3, in a sloped frame 20 (FIG. 2) surrounding the metal material 12 which forms the molded cavity 11. The coolant then exits each mold half 10 through an outlet 21. Frame 20 is sloped downwardly toward the sides following the contour of the coolant channel 19 so that mesh can be attached to the coolant channel walls to radiate heat.

Figure 2:
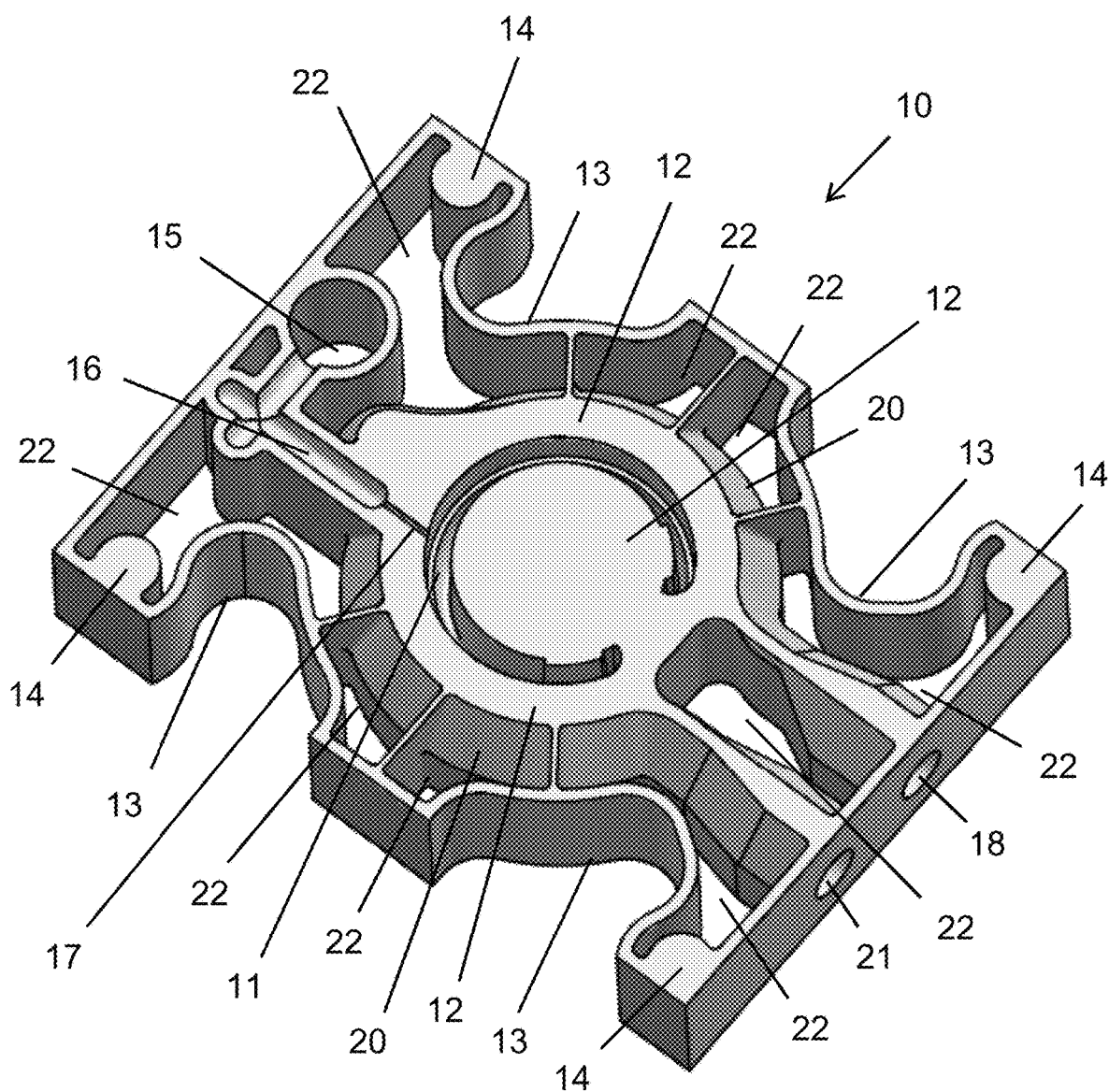
FIG. 2 is a perspective view of a shell of the mold half shown in FIG. 1, though shown without the metallic mesh material.
Figure 3:
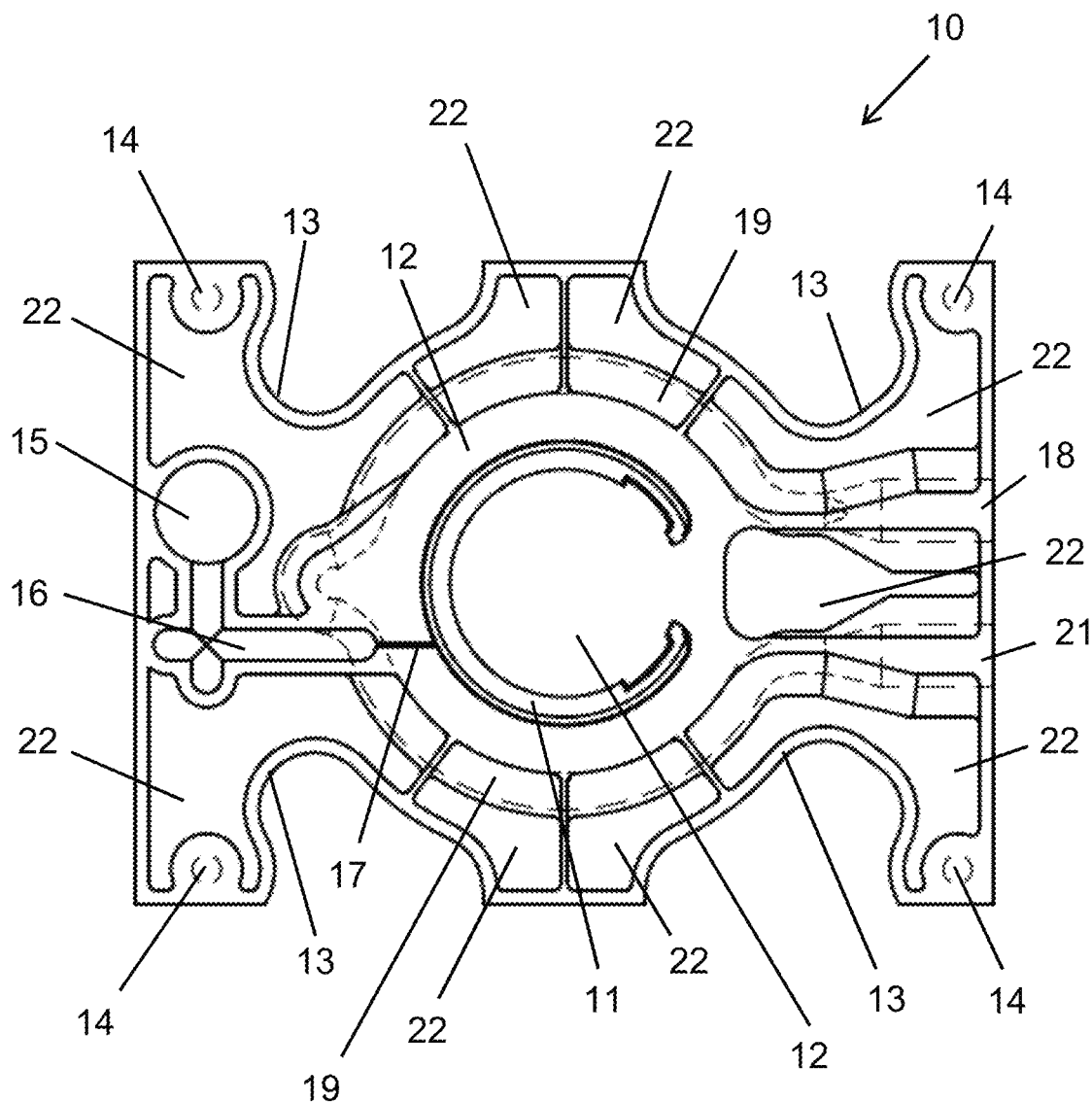
FIG. 3 is a skeleton-like or transparent view of the mold half shown in FIG. 1, though shown without the metallic mesh material.

The metallic shell of each mold half 10 is shown in FIG. 2. As can be seen there, a plurality of through cavities 22, which may also be referred to as mesh cavities 22, are formed in each mold half 10. The cavities 22 generally surround the metal material 12 which forms the molded cavity 11. These cavities 22 would normally be filled with solid metallic material in a conventional mold. However, such extra solid metallic material not only adds weight and expense to the mold, but importantly, such also increases the cooling time for the plastic part and thus the cycle time for the whole machine.

In one or more embodiments, each mold half 10 may include at least five through cavities 22, in other embodiments, at least seven through cavities 22, in other embodiments, at least nine through cavities 22, and in other embodiments, at least twelve through cavities 22. In one or more embodiments, each mold half 10 may include nine through cavities 22.

As suggested above, cavities 22 are filled with a metallic mesh material 23, as shown in FIG. 1. Such metallic mesh material 23 reduces the weight of the mold (i.e. mold half 10), decreases the cooling time of the mold, and thus decreases the cycle time for the whole machine. Moreover, if desired, additional cooling could be created by passing cool air through the mesh openings of metallic mesh material 23. The metallic mesh material 23 should be strong enough to support each mold half 10 and to withstand clamping of the two mold halves 10 together.

Advantageously, the metallic mesh material 23 is of a constant size across any given cavity 22. In one or more embodiments, the metallic mesh material 23 is of a constant size across all of the plurality of cavities 22. In other embodiments, a first cavity 22 may include metallic mesh material 23 of a first constant size and a second cavity 22 may include metallic mesh material 23 of a second constant size different than the first constant size.

As used herein, the reference to constant size may refer to the size of the mesh openings, the density of the mesh openings within any certain space, the thickness of the mesh grid, or combinations thereof. That is, the metallic mesh material 23 of any given cavity 22 may have a constant size of the mesh openings, a constant density of the mesh openings, and a constant thickness of the mesh grid. As suggested above, in one or more embodiments, the metallic mesh material 23 of all cavities 22 may have a constant size of the mesh openings, a constant density of the mesh openings, and a constant thickness of the mesh grid.

As suggested above, the cavities 22 generally surround the metal material 12 which forms the molded cavity 11. That is, the metal material 12 and molded cavity 11 are separate from the metallic mesh material 23, such that metal material 12 and molded cavity 11 may be said to be devoid of metallic mesh material 23.

As suggested above, the metallic mesh material 23 is of a constant size across any given cavity 22. As such, the metallic mesh material 23 may be formed without an adjustment of the number of openings in the mesh and without an adjustment of the thickness of the mesh grid. This may be referred to as the manufacturing of mold half 10 being devoid of a step of adjusting the number of openings in metallic mesh material 23 and being devoid of a step of adjusting the thickness of the grid of metallic mesh material 23.

As shown in FIG. 1, which shows a plan view of mold half 10, the metallic mesh material 23 is formed in the same plane as the mold half 10. That is, when mold half 10 is positioned horizontally, the metallic mesh material 23 is also horizontally aligned. This may also be referred to as the metallic mesh material 23 being in line with the closing axis of the mold or as the metallic mesh material 23 being formed consistently in the direction of the mold.

It should thus be appreciated that a mold described herein will decrease cycle time resulting in the formation of more parts in less time, and will otherwise improve the injection molding art.

In light of the foregoing, it should be appreciated that the present invention advances the art by providing an improved injection mold. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An injection mold, the injection mold comprising
two mold halves, each of the mold halves including
a mold cavity coupled with a plastic material inlet to make a plastic part within the mold cavity,
a solid metal material housing the mold cavity,
a conformal cooling channel positioned around the solid metal material,
a plurality of mesh-containing cavities containing metallic mesh material and positioned around the solid metal material,
wherein the metallic mesh material of any of the plurality of mesh-containing cavities is of a constant size.

2. The mesh injection mold of claim 1, wherein the metallic mesh material of all of the plurality of mesh-containing cavities is of a constant size.

3. The mesh injection mold of claim 1, wherein the metallic mesh material of a first one of the plurality of mesh-containing cavities is of a first constant size and the metallic mesh material of a second one of the plurality of mesh-containing cavities is of a second constant size different than the first constant size.

4. The mesh injection mold of claim 2, wherein the plurality of mesh-containing cavities includes nine cavities.

5. The mesh injection mold of claim 2, wherein the metallic mesh material is formed without an adjustment of a number of openings in the metallic mesh material and without an adjustment of a thickness of a grid of the metallic mesh material.

6. The mesh injection mold of claim 1, wherein the solid metal material includes a sloped frame surrounding the solid metal material, wherein the sloped frame is sloped downwardly corresponding with the conformal cooling channel.

7. The mesh injection mold of claim 1, wherein the metallic mesh material is formed in a same plane as the mold half.

8. The mesh injection mold of claim 1, wherein the mold cavity and the solid metal material are devoid of mesh material.

9. The mesh injection mold of claim 2, wherein each of the mold halves has a rectangular outer perimeter.

10. The mesh injection mold of claim 9, wherein each of the mold halves further includes a plurality of cutouts to reduce the amount of metal in the mold half.

11. The mesh injection mold of claim 10, wherein each of the mold halves includes corners provided with fastener-receiving apertures for attaching the mold half to a stationary base or platen of a molding machine or to a moveable ram of the molding machine.

\* \* \* \* \*